(12) United States Patent
Spohr

(10) Patent No.: US 9,513,766 B2
(45) Date of Patent: Dec. 6, 2016

(54) METHOD AND APPARATUS FOR RECEIVING FORMATION ACTION INSTRUCTION

(71) Applicant: XYRALITY GMBH, Hamburg (DE)

(72) Inventor: Alexander Spohr, Hamburg (DE)

(73) Assignee: XYRALITY GMBH, Hamburg (DE)

( * ) Notice: Subject to any disclaimer, the term of this patent is extended or adjusted under 35 U.S.C. 154(b) by 482 days.

(21) Appl. No.: 13/790,422

(22) Filed: Mar. 8, 2013

(65) Prior Publication Data
US 2014/0229893 A1 Aug. 14, 2014

(30) Foreign Application Priority Data
Feb. 11, 2013 (DE) .................... 20 2013 001 240 U

(51) Int. Cl.
  *G06F 3/048* (2013.01)
  *G06F 3/0481* (2013.01)
  *H04M 1/725* (2006.01)

(52) U.S. Cl.
  CPC ...... *G06F 3/04817* (2013.01); *H04M 1/72519* (2013.01)

(58) Field of Classification Search
None
See application file for complete search history.

(56) References Cited

U.S. PATENT DOCUMENTS

| | | | |
|---|---|---|---|
| 5,760,788 A * | 6/1998 | Chainini et al. | 345/474 |
| 2002/0045470 A1* | 4/2002 | Atsumi et al. | 463/1 |
| 2007/0005421 A1* | 1/2007 | Labio et al. | 705/14 |
| 2008/0200239 A1* | 8/2008 | Gilmore et al. | 463/22 |
| 2013/0305385 A1* | 11/2013 | Korteweg et al. | 726/27 |
| 2013/0332856 A1* | 12/2013 | Sanders et al. | 715/753 |
| 2014/0108936 A1* | 4/2014 | Khosropour et al. | 715/735 |
| 2014/0278638 A1* | 9/2014 | Kreuzkamp et al. | 705/7.15 |

* cited by examiner

*Primary Examiner* — Ajay Bhatia
*Assistant Examiner* — Haimei Jiang
(74) *Attorney, Agent, or Firm* — Saliwanchik, Lloyd & Eisenschenk

(57) ABSTRACT

Embodiments relate to a graphical user interface to be displayed on a display apparatus, the graphical user interface comprising an addressable window which is assigned to a selectable object, where the window has a list with a plurality of buttons, where there is assigned to each button an action of a particular type in relation to the object assigned to the window, where there is assigned to one button a formation action which can be performed with elements from a plurality of element types, where the performance of the formation action requires the selection of the number of elements to be used for the formation action from a maximum number of elements for at least one element type. A further formation action can be assigned to a further button, where the element types and the number of elements to be used for the further formation action are determined by the element types and elements used in the last performed formation action.

20 Claims, 2 Drawing Sheets

METHOD AND APPARATUS FOR RECEIVING FORMATION ACTION INSTRUCTION

BACKGROUND OF INVENTION

Embodiments of the invention relate to a graphical user interface to be displayed on a display apparatus, the graphical user interface having an addressable window that is assigned to a selectable object, where the window has a list with a plurality of buttons, where there is assigned to each button an action of a particular type in relation to the object assigned to the window, where there is assigned to one button a formation action which can be performed with elements from a plurality of element types, where the performance of the formation action requires the selection of the number of elements to be used for the formation action from a maximum number of elements for at least one element type.

In a graphical user interface of the type mentioned above, there are types of actions that are executed repeatedly by the user. Such a formation action is performed with elements from a plurality of element types, wherein the performance of the formation action requires the selection by the user of a formation, that is to say the number of elements to be used for the formation action from a maximum number of elements for at least one element type. This selection is generally associated with a large number of individual operating steps. In many cases, the user does not wish to change the number of elements to be used for the formation action and the particular element types when performance of the formation action is repeated. Nevertheless, the complete selection of the number of elements to be used for the formation action from a maximum number of elements for at least one element type is necessary in the prior art each time the formation action is performed. This is time consuming and inconvenient for the user.

BRIEF SUMMARY

An object of specific embodiments of the invention is to provide a graphical user interface and a correspondingly equipped display apparatus and also a digital-electronic device, which permits more rapid and more convenient operation by the user.

Embodiments of the invention achieve this object with the features of the independent claims. An embodiment of the invention provides a further button in the window, to which button a further formation action is assigned, wherein the element types to be used for the further formation action and the number of elements in question are determined by the element types and elements used in the preceding formation action. If the user does not wish to change the number of elements to be used for the formation action and the element types when performance of the formation action is repeated, he can simply actuate the further button. The invention accordingly provides the possibility of executing a formation action by actuating the further button without entering or selecting the number of elements to be used for the further formation action from a maximum number of elements for the element types in question. A considerable time saving and significantly improved convenience for the user are accordingly achieved by the execution of the further formation action.

Preferred applications of the invention relate to graphical user interfaces for mobile or portable digital-electronic devices, in particular digital communication devices such as smart phones and mobile telephones, digital media players, tablet computers, notebooks. Its use on stationary computers such as PCs is also included. Digital-electronic devices according to the invention have a screen, which may advantageously be a touch-sensitive screen. However, screens that are not touch-sensitive are also included.

BRIEF DESCRIPTION OF FIGURES

The invention will be explained hereinbelow by means of preferred embodiments with reference to the accompanying figure, in which.

DETAILED DESCRIPTION OF INVENTION

Figure 1:
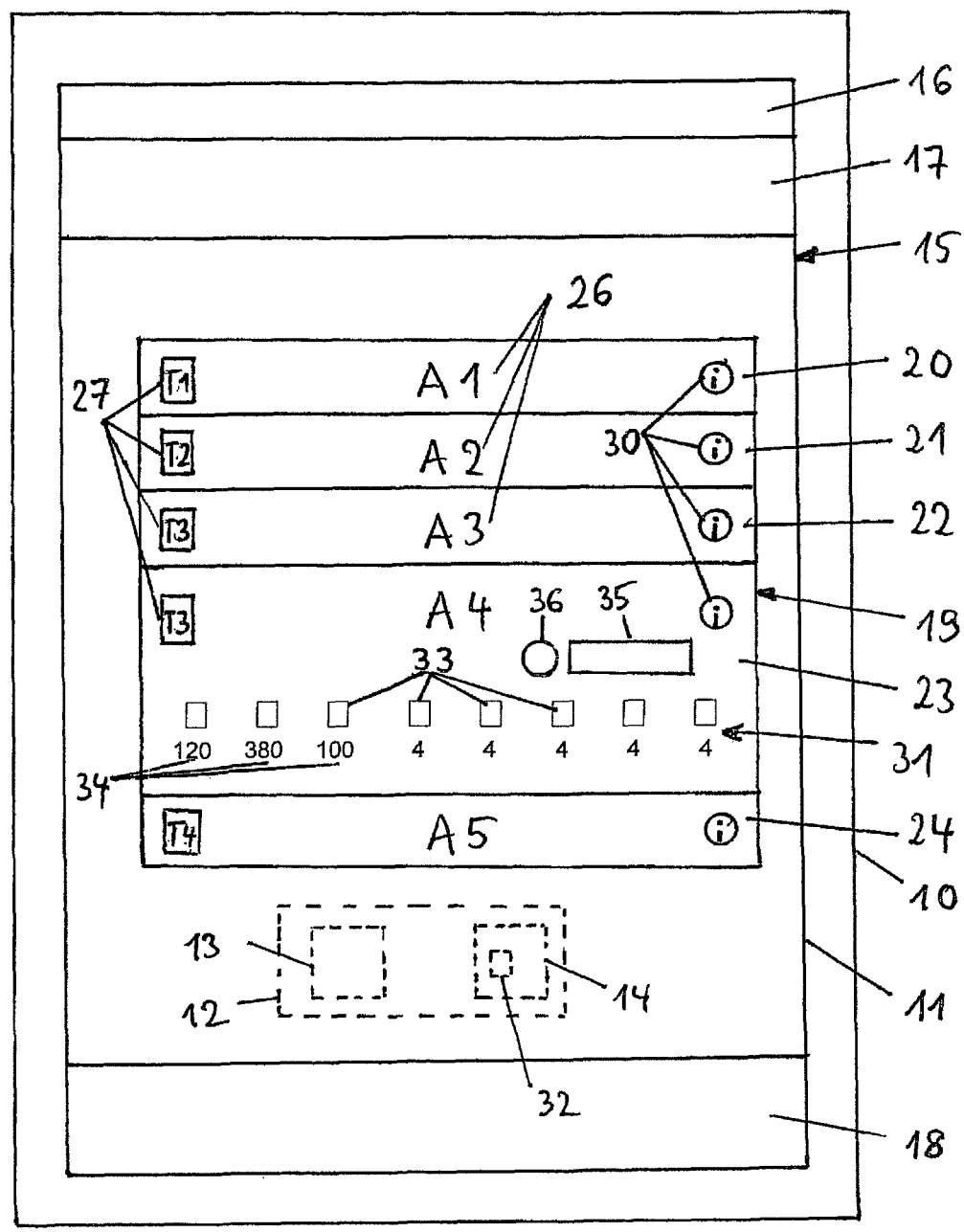
FIG. 1 shows a schematic view of a digital-electronic device having a display apparatus and a graphical user interface.

Embodiments of the invention achieve this object with the features of the independent claims. An embodiment of the invention provides a further button in the window, to which button a further formation action is assigned, wherein the element types to be used for the further formation action and the number of elements in question are determined by the element types and elements used in the preceding formation action. If the user does not wish to change the number of elements to be used for the formation action and the element types when performance of the formation action is repeated, he can simply actuate the further button. The invention accordingly provides the possibility of executing a formation action by actuating the further button without entering or selecting the number of elements to be used for the further formation action from a maximum number of elements for the element types in question. A considerable time saving and significantly improved convenience for the user are accordingly achieved by the execution of the further formation action.

Preferred applications of the invention relate to graphical user interfaces for mobile or portable digital-electronic devices, in particular digital communication devices such as smart phones and mobile telephones, digital media players, tablet computers, notebooks. Its use on stationary computers such as PCs is also included. Digital-electronic devices according to the invention have a screen, which may advantageously be a touch-sensitive screen. However, screens that are not touch-sensitive are also included.

The digital-electronic device 10 is, for example, a smart phone having a touch-sensitive screen 11. The device 10 has a digital-electronic control device 12, shown only schematically in FIG. 1, which comprises in particular a programmable or programmed microprocessor or microcontroller 13 and a memory device 14. The memory device 14 can comprise, for example, a RAM memory, a cache memory and/or a fixed-disk memory and can also be implemented partially or completely in the microprocessor 13. A graphical user interface (GUI) 15 for display on the screen 11 is stored in the memory device 14. The graphical user interface 15 generally fills the screen 11 completely. The graphical user interface 15 is operated by the user by means of a pointing/input device. In the present case, the pointing/input device is provided by the touch-sensitive screen 11. In the case of a screen that is not touch-sensitive, a separate pointing device, such as, for example, a mouse, and/or a separate input device, such as, for example, a keyboard device, is advantageously provided.

The graphical user interface 15 comprises a plurality of possible screen displays, one of which is shown in FIG. 1. The screen display according to FIG. 1 comprises, for example, a region 16 for displaying information relating to the operation of the device 10, here, for example, reception quality, network operator, communication protocol, date, time and/or battery status. The remainder of the screen display according to FIG. 1 is assigned to a specific program that is currently being executed and comprises, for example, general information regions 17, 18 and a window 19 which is assigned to an object that can be selected by the user, for example an external base which cannot be controlled by the user. The window 19 is called up by the program when, in a preceding screen display which is not shown, the user selects the relevant object from a plurality of similar selectable objects.

The window 19 comprises a list with a plurality of buttons, here, for example, five buttons, 20 to 24 which are arranged in lines and can be actuated by the user by means of the pointing device, here the touch-sensitive screen 11, by tapping. Each button is assigned to a particular action A1 to A5 of a particular action type T1 to T4 in relation to the selected object. Each button 20 to 24 advantageously contains a description field 26 for describing the action in question and a graphical symbol 27 for showing the action type in question. In the embodiment according to FIG. 1, the formation actions A3 and A4 are of the same type T3, namely of the formation action type, and therefore have the same symbol 27. Each button 20 to 24 can further have an actuatable symbol 30, actuation of which calls up text describing or explaining the corresponding action.

In the embodiment according to FIG. 1, the formation action A3 requires the selection of elements to be used for the formation action A3. A limited number of element types ET1, ET2, . . . , ETn are available therefor. A limited number k1, k2, . . . , kn of elements which can be selected for the formation action A3 are available for each element type. If the user wishes to perform, for example, a formation action of type T3, he actuates button 22.

In a further window (not shown), which is linked with button 22 and is called up by actuation of button 22, an input field is provided for each element type, into which the user can enter the number of elements to be used for the formation action. The number is preferably an integer between zero and the corresponding maximum number ki, where zero can be preset. A group of elements selected by the user for a formation action that is to be performed is also referred to as a formation. For illustrative purposes it is here arbitrarily assumed that there are ten element types and the user selects 120 elements of type E1, 380 elements of type E2, 100 elements of type E3 and 4 elements of each of types E5, E6, E8, E9 and E10. The user accordingly does not select any elements of type E4 and E7. By actuating a further button in this further window, the formation action A3 is then immediately initiated.

Each time the formation action A3 is initiated, the selected formation is stored as the "last used formation" in a formation memory 32 in the memory device 14. The formation memory 32 is accordingly continuously updated each time a formation action A3 is performed. If, apart from the formation actions A3 and A4, there are further formation actions of type T3, the formation used in such a further formation action of type T3 can also be stored in the formation memory 32 after such a further formation action has been performed.

If the user wishes to execute a formation action of the same type T3 again with the same formation, in the prior art he must again actuate button 22 in FIG. 1 and again enter the number of elements to be used for all the desired element types. This frequently requires a large number of user entries, as, for example, also in the example mentioned above.

According to specific embodiments of the invention, button 23 is provided, which permits the formation action A4 of the same type T3 with the last used formation without entry of the desired element types and the number of elements to be used. Button 23 can therefore also be referred to as the "last formation button". Button 23 advantageously comprises a display region 31 in which the formation to be used for the formation action A4 is displayed. The formation to be used for the formation action A4 is the last used formation, which is stored in the formation memory 32 and is called up from there when the window 19 is opened. The display region 31 preferably contains at least a plurality of graphical symbols 33, which reproduce the element types of the last used formation. The symbols 33 are preferably arranged in rows. In a spatial relationship to each symbol 33, here, for example, beneath the symbol 33, a number 34 is displayed, which reproduces the number of elements of the corresponding element type in the last used formation. A series of numbers 34 is thus obtained. If the display of the last used formation in the display region 31 does not fit into one line, a new line is begun. The display region 31 can therefore have two or more lines with symbols 33 and numbers 34. In this case, the height of the button 23 is advantageously adjusted automatically, the window 19 preferably being lengthened downwards. The element types which are not to be used in the formation action A4, that is to say the element types which were not selected in the last used formation (number zero), are preferably not displayed in the display region 31 or are faded out, which increases the clarity. In the above illustrative example, these are element types E4 and E7.

The formation action A4 is initiated by simple actuation of button 23. A pop-up window (not shown) is preferably associated with button 23, which pop-up window pops up when button 23 is actuated. The pop-up window preferably comprises an actuatable confirmation button, actuation of which immediately initiates the formation action A4. The pop-up window preferably also comprises an actuatable stop button, actuation of which stops the formation action A4 and, for example, returns to the screen view according to FIG. 1. The confirmation prompt element described above can also be provided by means other than a pop-up window. Furthermore, a confirmation prompt element may be unnecessary in further embodiments. The formation action A4 is then initiated immediately by simple actuation of button 23.

Situations may occur in which the formation action A4 cannot be performed, for example if insufficient elements are available for one or more element types, that is to say if the number of available elements is smaller than the corresponding number in the last used formation stored in the formation memory 32. In that case, button 23 is preferably not displayed, that is to say is faded out, as long as the state of non-executability of the formation action A4 persists, as a result of which the clarity is increased. As soon as the formation action A4 can be executed again, button 23 is advantageously displayed, or faded in, again.

Button 23 can have a time information region 35 for displaying time information or a duration in respect of the formation action A4. For example, there can be multi-phase formation actions which enter an active phase after a particular period of time has elapsed; that period of time is then advantageously displayed in the time information region 35. A graphical time symbol 36 can be assigned to the time information region 35, which time symbol 36 displays further time information in graphical form. For example, the time symbol 36 can represent a sun or a moon, according to whether the beginning of the active phase of the formation action A4 occurs during the day or at night.

It is not necessary for all the element types which can be selected for the formation action A3 to be part of the formation to be stored in the formation memory 32; in general, the element types to be stored in the formation memory 32 represent a subset of all the element types which can be selected for the formation action A3. The element types that are not part of the formation to be stored in the formation memory 32 can, for example, remain disregarded in the formation action A4. Alternatively, those element types, or some of them, and the corresponding number of elements can be selectable by the user in the window linked with button 23.

Figure 2:
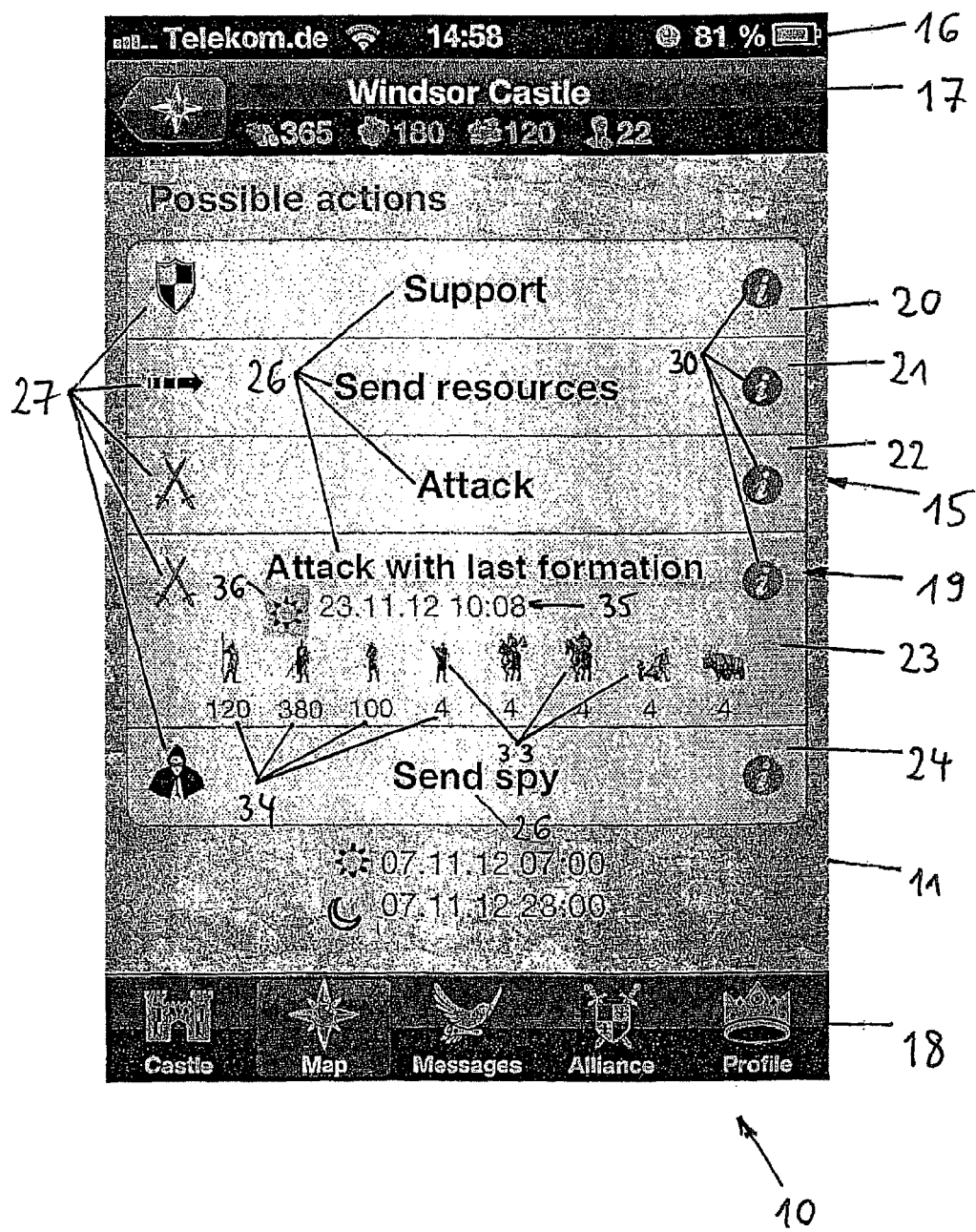
FIG. 2 shows a practical embodiment of a digital-electronic device having a display apparatus and a graphical user interface.

A practical application of an embodiment of the invention is shown in FIG. 2. It relates to an online game to be played via the internet by a large number of players remote from each other. This kind of game is often called a Massively Multiplayer Online Game (MMOG). FIG. 2 shows the graphical user interface on a touch-sensitive screen 11 of a smart phone 10 of a player A. It should be understood that the MMOG is played or playable by thousands or more players each of which has its own electronic device with a screen and a graphical user interface implemented similar to that shown in FIG. 2. Furthermore, it should be understood that although FIG. 2 relates to an MMOG with a medieval scenario, the invention is by no means restricted to this, but can be applied to very different kinds of MMOG scenarios.

Player A belonging to the electronic device 10 shown in FIG. 10 has an own basis, here a castle or more generally a habitat, called "Windsor Castle" by way of example. Player A has decided to attack the castle of another player B, the name of which is not shown in FIG. 2. In order to do this, player A has for example touched, or clicked on, the castle of player B he wants to attack in a previous screen display having for example the form of a map. In response to this touching or clicking action, the screen display shown in FIG. 2 opened up, which shows all possible actions with respect to player B's castle. For example, player B's castle could be supported by touching or clicking on the button 20, resources could be sent to him by touching or clicking on the button 21, or he could be spied on by touching or clicking on the button 24.

In the present case, since player A wants to attack player B's castle, he can do so by pressing, i.e. touching or clicking on, the button 22. An attack is performed by choosing an attack formation. In the present example, there are eight types of elements which may be used in an attack, comprising a plurality of attackers, here warriors, for example spearmen, swordsmen, bowmen, crossbowmen, armored riders, lancers, as well as two kinds of transport vehicles for carrying home robbed goods from the attacked castle, here handcarts and oxcarts. It should be understood that the number of element types can be different from eight, the number of attacker types can be different from six, and the number of transport vehicle types can be different from two and in particular form example zero.

It may be supposed that in the last attack against any other castle before the current attack, the player has used an attack formation of 120 spearmen, 380 swordsmen, 100 bowmen, 4 crossbowmen, 4 armored riders, 4 lancers, 4 handcarts and 4 oxcarts. It may also be supposed that player A wants to perform the current attack with exactly the same formation, namely 120 spearmen, 380 swordsmen, 100 bowmen, and so on.

When player A performs the current attack by pressing the attack button 22 he would have to fill in the number of each and any element he wants to use for the attack, namely the numbers "120", "380", "100", "4", "4", "4", "4", "4" in a screen display opening up in response to pressing the button 22. This would be laborious and time consuming.

According to an embodiment of the invention, however, player A may perform the current attack by simply pressing the "Attack with last formation" button 23, or "Last formation" button 23 for short, without having to fill in the number of each and any element he wants to use for the attack. The "Last formation" button 23 shows an icon or graphical symbol for each type of attacking element which has been used in the last attack, namely an icon showing a spearman, an icon showing a swordsman, an icon showing a bowman, and so on. The icons are preferably arranged in a horizontal row as shown in FIG. 2. Beneath each symbol a number is shown which indicates the number of elements used in the last attack of the corresponding attacking element type. Consequently, the "Last formation" button 23 shows the number "120" under the spearman icon, the number "380" under the swordsman icon, the number "100" under the bowman icon, and so on, leading to a preferably horizontal row of numbers "120", "380", "100", "4", "4", "4", "4", "4". Furthermore, the "Last formation" button 23 shows in the time information field 35 the predicted date and time of the attack, and a time symbol 36, here a sun indicating that the attack would take place at daytime.

Upon pressing the "Last formation" button 23 the attack against player B's castle may be initiated directly and immediately. Preferably, in response to pressing the "Last formation" button 23 another window pops up showing a confirmation question, for example "Do you really want to attack the castle B with the last used formation?", as well as a confirming button like "OK" and a cancelling button like "Cancel". Upon pressing the "OK" button, player B's castle is attacked directly and immediately using the last used formation, i.e. 120 spearmen, 380 swordsmen, 100 bowmen, and so on. Upon pressing the "Cancel" button, the confirmation window is closed and the gaming program running on the smart phone 10 returns for example to the screen display shown in FIG. 2, or the map, or any other suited screen display.

Aspects of the invention, such as generating and providing a graphical user interface, displaying a graphical user interface, providing and controlling an electronic control device, and storing previously used formations or other information, may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, transitory and non-transitory, transient and non-transient media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile disks (DVD), holographic media or other optical disk storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

I claim:

1. A method in a computer system for receiving a formation action instruction from a user, comprising:

presenting a plurality of buttons to a user, wherein there is assigned to each button of the plurality of buttons a corresponding action in relation to a selectable object of a corresponding plurality of actions in relation to the selectable object, wherein each action in relation to the selectable object of the plurality of actions in relation to the selectable object has a corresponding action type selected from at least two action types, wherein the at least two action types comprise:

a formation action type, wherein an action in relation to the selectable object having the formation action type is performed with one or more elements, wherein the one or more elements comprise $m_1, m_2, \ldots, m_n$ elements of a corresponding n element types, wherein $m_1, m_2, \ldots, m_n$ are integers greater than or equal to zero, and n is an integer greater than or equal to 2, wherein there is assigned to a first button of the plurality of buttons a first action in relation to the selectable object of the plurality of actions in relation to the selectable object, wherein the first action in relation to the selectable object has the formation action type, wherein performance of an action in relation to the selectable object having the formation action type requires selection by the user of $m_1, m_2, \ldots, m_n$, such that, for $i=1, 2, \ldots, n$, $m_i$ is in a range from zero to $k_i$, wherein $k_i$ is an $i^{th}$ maximum number of a corresponding n maximum numbers, $k_1, k_2, \ldots, k_n$, wherein $k_1, k_2, \ldots, k_n$ are integers greater than or equal to zero, wherein $k_i$ corresponds to a maximum number of elements of an $i^{th}$ element type of the n element types selectable by the user for the action in relation to the selectable object having the formation action type, wherein there is assigned to a second button of the plurality of buttons a second action in relation to the selectable object, wherein the second action in relation to the selectable object has the formation action type, wherein the second action in relation to the selectable object is the same as the first action in relation to the selectable object, wherein selection by the user of $m_1, m_2, \ldots, m_n$ for the first action in relation to the selectable object requires the user to enter $m_1, m_2, \ldots, m_n$ for the first action in relation to the selectable object, wherein selection by the user of $m_1, m_2, \ldots, m_n$ for the second action in relation to the selectable object requires the user to actuate the second button, wherein $m_1, m_2, \ldots, m_n$ for the second action in relation to the selectable object are $m_1, m_2, \ldots, m_n$ of a most recent performed first action in relation to the selectable object, wherein upon actuation of the first button, further comprising:

presenting to the user n input fields corresponding to the n element types, wherein the user can enter $m_1, m_2, \ldots, m_n$ for the first action in relation to the selectable object into the n inputs fields, respectively, and upon entry of $m_1, m_2, \ldots, m_n$ for the first action in relation to the selectable object into the n inputs fields, respectively, presenting a first further button to the user, wherein actuation of the first further button initiates the first action in relation to the selectable object, wherein upon actuation of the second button, further comprising initiating the second action in relation to the selectable object, and wherein presenting the plurality of buttons to the user enables the user to participate as a player in a multiplayer online game played via the internet.

2. The method according to claim 1,
wherein the second button is faded out if the second action cannot be performed.

3. A method of controlling a digital electronic device having a display apparatus and a memory device, comprising:

displaying a graphical user interface on a display apparatus of a digital electronic device, wherein the graphical user interface enables a user to participate as a player in a multiplayer online game to be played via the internet, wherein the graphical user interface comprises:
an addressable window that is assigned to a selectable object, wherein the selectable object belongs to another player in the multiplayer online game,
wherein the addressable window is called up when the user selects the selectable object from a plurality of selectable objects,
wherein the addressable window has a list with a plurality of buttons,
wherein there is assigned to each button of the plurality of buttons an action of a corresponding plurality of actions, wherein each action of the plurality of actions has a corresponding action type in relation to the selectable object assigned to the addressable window selected from two or more action types, wherein the two or more action types includes a formation action type, wherein an action having the formation action type involves a formation wherein the formation comprises one or more elements, wherein the one or more elements comprise $m_1, m_2, \ldots, m_n$ elements of a corresponding n element types, wherein $m_1, m_2, \ldots, m_n$ are integers greater than or equal to zero, and n is an integer greater than or equal to 2, wherein the addressable window comprises:
a first button of the plurality of buttons, wherein a first action is assigned to the first button wherein the first action has the formation action type, such that the first action is a first formation action,
wherein the first formation action is performed with a first $m_1, m_2, \ldots, m_n$, elements of the corresponding n element types,
wherein the first button is linked with a further window such that actuating the first button calls up the further window,
wherein in the further window n input fields are provided for input of the first $m_1, m_2, \ldots, m_n$ by the user, wherein the user can enter the first $m_1, m_2, \ldots, m_n$ to be used for the first formation action into the n input fields,
wherein performance of the first formation action requires the user to enter at least one of the first $m_1, m_2, \ldots, m_n$ to be used for the first formation action from a corresponding at least one of the first n maximum numbers, $k_1, k_2, \ldots, k_n$ of elements for the n element types, such that any of the first $m_1, m_2, \ldots, m_n$ the user does not enter are zero, wherein the further window comprises a further button,
wherein upon the user actuating the further button, further comprising initiating the first formation action with the at least one of the first $m_1, m_2, \ldots, m_n$ elements of the corresponding at least one element type, wherein each time the first formation action is initiated by actuation of the further button, further comprising storing the at least one of the first $m_1, m_2, \ldots, m_n$ used in the first formation action as a last used formation in a formation memory provided in the memory device, wherein the addressable window comprises a second button, wherein a second action is assigned to the second button of the plurality of buttons, wherein the second action has the formation action type, such that the second action is a second formation action, wherein the second formation action is the same as the first formation action and wherein the second formation to be used for the second formation action is the last used formation called up from the formation memory.

4. The method according to claim 3,
wherein the selectable object is a habitat belonging to the other player,
wherein the first action is an attack on the habitat belonging to the other player, and
wherein the n element types comprise element types selected from the group consisting of one or more type of attackers and one or more type of warriors.

5. The method according to claim 1,
wherein upon actuation of the second button, initiating the second action comprises:
presenting a second further button to the user,
wherein actuation of the second further button initiates the second action.

6. The method according to claim 1,
wherein the formation action type is an attack on the selectable object belonging to another player in a multiplayer online game played via the internet, and
wherein the n element types comprise different types of attackers and warriors.

7. The method according to claim 3,
wherein the second button comprises a display region for displaying the n element types to be used for the second formation action and $m_1, m_2, \ldots, m_n$ to be used for the second action.

8. The method according to claim 7,
wherein the display region displays a corresponding graphical symbol of n graphical symbols to represent each element type of the n element types elements of which are to be used for the second action.

9. The method according to claim 8,
wherein spatially associated with each graphical symbol of the n graphical symbols, the number of elements, $m_i$, is displayed to indicate a number of elements of the $i^{th}$ element type of the n element types to be used for the second action.

10. The method according to claim 7,
wherein element types of the n element types elements of which are not to be used in the second action are faded out in the display region.

11. The method according to claim 3,
wherein the second button has a time information region for time information relating to the second action.

12. The method according to claim 11,
wherein the time information region contains a graphical time symbol.

13. The method according to claim 3,
wherein a confirmation prompt element is linked with the second button.

14. The method according to claim 13,
wherein the confirmation prompt element is a pop-up window.

15. The method according to claim 13,
wherein the confirmation prompt element has an actuatable confirmation button which is assigned to the second action in order to initiate the second action.

16. The method according to claim 8,
wherein element types of the n element types that are not to be used in the second formation action are faded out in the display region.

17. The method according to claim 14,
wherein the confirmation prompt element has an actuatable confirmation button which is assigned to the second formation action in order to initiate the second formation action.

18. The method according to claim 3,
wherein the n element types comprise different types of attackers or warriors.

19. The method according to claim 3,
wherein the n element types comprise at least one transport vehicle.

20. A digital-electronic device, comprising:
a display apparatus;
a memory device; and
an electronic control device,
wherein the digital-electronic device contains a set of instructions that when executed cause the electronic control device to perform the method of claim 3.

* * * * *